(12) United States Patent
Mancinelli et al.

(10) Patent No.: US 10,377,182 B2
(45) Date of Patent: Aug. 13, 2019

(54) TIRE WITH IMPROVED TRACTION

(71) Applicant: TRELLEBORG WHEEL SYSTEMS ITALIA S.P.A., Tivoli (RM) (IT)

(72) Inventors: Piero Mancinelli, Tivoli (IT); Massimo Limiti, Tivoli (IT)

(73) Assignee: TRELLEBORG WHEEL SYSTEMS ITALIA S.P.A., Tivoli (RM) (IT)

(*) Notice: Subject to any disclaimer, the term of this patent is extended or adjusted under 35 U.S.C. 154(b) by 45 days.

(21) Appl. No.: 14/909,117

(22) PCT Filed: Jul. 30, 2014

(86) PCT No.: PCT/IT2014/000200
§ 371 (c)(1),
(2) Date: Jan. 30, 2016

(87) PCT Pub. No.: WO2015/015525
PCT Pub. Date: Feb. 5, 2015

(65) Prior Publication Data
US 2016/0193882 A1  Jul. 7, 2016

(30) Foreign Application Priority Data
Jul. 30, 2013  (IT) .............................. RM2013A0447

(51) Int. Cl.
*B60C 11/03* (2006.01)
*B60C 11/13* (2006.01)

(52) U.S. Cl.
CPC ...... *B60C 11/0316* (2013.01); *B60C 11/0332* (2013.01); *B60C 11/1307* (2013.01);
(Continued)

(58) Field of Classification Search
CPC ............. B60C 11/0316; B60C 11/0332; B60C 11/1307; B60C 2011/0313;
(Continued)

(56) References Cited

U.S. PATENT DOCUMENTS

2011/0005651 A1   1/2011   Mori

FOREIGN PATENT DOCUMENTS

| CN | 1712252 A | 12/2005 |
|---|---|---|
| JP | S60-145902 U | 9/1985 |

(Continued)

OTHER PUBLICATIONS

Koichi, JP 2008018751—Machine Translation.*
(Continued)

*Primary Examiner* — Matthew J Daniels
*Assistant Examiner* — Yunju Kim
(74) *Attorney, Agent, or Firm* — Hedman & Costigan, P.C.; James V. Costigan; Kathleen A. Costigan

(57) ABSTRACT

The present invention concerns a tire (10) comprising a tread (11) provided with a base surface (14) and with a plurality of ribs (12), each rib (12) being provided with a front wall and a rear wall, and a shaped profile (15), wherein the shaped profile (15) has a section that defines at least one flat surface (17) of the shaped profile (15) which is parallel, or inclined at an angle α up to 20°, to the surface of the head (16) of the rib and which is joined to the front wall of the rib (12) by means of a connecting surface (18), at least one sharp angle (19) of the shaped profile (15) and at least one front wall (23) of the shaped profile (15), which is joint to the base surface (14) of the tread (11) by means of a connecting surface (21).

8 Claims, 3 Drawing Sheets

Figure 1:
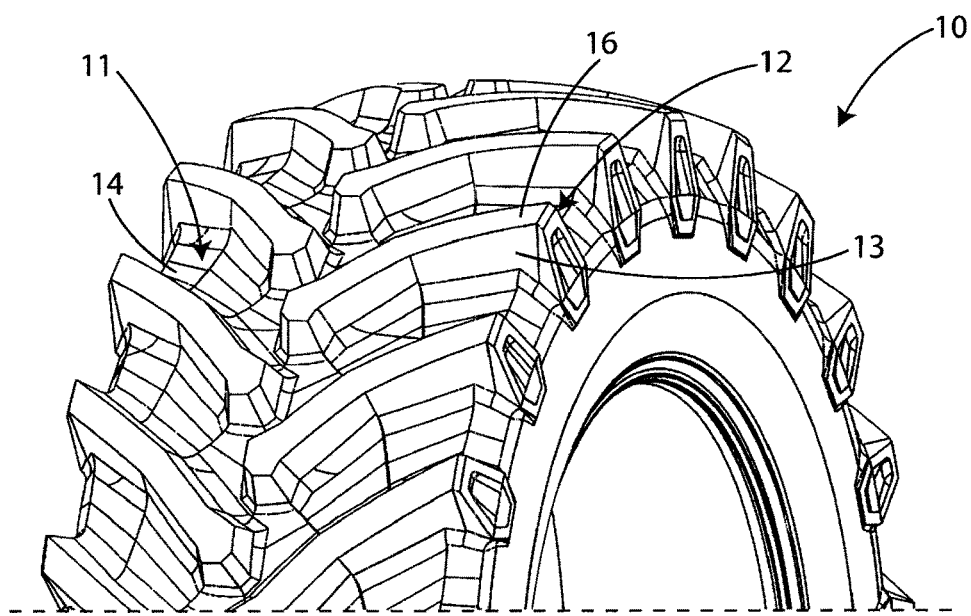

(52) U.S. Cl.
CPC ............... *B60C 2011/0313* (2013.01); *B60C 2011/0334* (2013.01); *B60C 2011/1338* (2013.01); *B60C 2200/08* (2013.01)

(58) Field of Classification Search
CPC ..... B60C 2011/0334; B60C 2011/1338; B60C 2200/08
USPC ...................................... 152/209.12, 209.13
See application file for complete search history.

(56) References Cited

FOREIGN PATENT DOCUMENTS

| | | |
|---|---|---|
| JP | S62-151101 U | 9/1987 |
| JP | H05000607 A | 1/1993 |
| JP | 2008-018751 A | 1/2008 |

OTHER PUBLICATIONS

Notification of Transmittal of the International Search Report and the Written Opinion of the International Searching Authority dated Dec. 15, 2014.
Italian Patent Office Search Report and Written Opinion dated Apr. 17, 2014 (partially in English).
CN 1712252 A English machine translation of description dated Dec. 28, 2005.

\* cited by examiner

TIRE WITH IMPROVED TRACTION

The present invention concerns a tire with improved traction.

The invention was developed referring in particular to the field of tires for agricultural use, construction and forestry, but the proposed solution can also be applied to tires for any kind of vehicle that needs an improvement of the traction in critical conditions of the terrain on which it operates.

It is known that tires for agricultural vehicles have different needs from the ordinary tires, given that very often require traction both on loose and on tough terrain.

In particular, the design of the traditional agricultural tread has difficulties in advancement on slippery (mud or snow) or slithery terrain or on wet turf. Conventionally, this problem can be solved by an increase in the extent of the tread or by an increase in the number of ribs (generally indicated with the name of lugs) in the grip on the ground.

The width of the tread is very often limited by the rules of the traffic laws, which provide for a maximum encumbrance which must be respected for all the vehicles that move on asphalt. This limits, especially for means of larger dimensions, the maximum width that tire can reach.

As regards instead the design of the tread, there is not always the possibility to change or adapt it. The increase of the traction useful surface can in fact cause the tire other problems concerning the self-cleaning and the penetration on soft ground.

The increase in traction is necessary not only as regards the improvement of the performance, but also because of the awareness that in the future it will be necessary to think considering all the economic and environmental factors on which the tires impact over their useful life. In fact, the reduction of slip on the field allows a reduction in fuel consumption.

It is also preferable that the increase of the traction occurs without increasing significantly the weight of the product, and without compromising other performance characteristics of the cover.

In conclusion, the need to increase useful traction must be accompanied by not too significant variations of the size and the design of the tire.

In this context it is included the solution according to the present invention, with the aim of providing a tire which allows to increase the useful traction for the same overall dimensions and with a minimum change of the overall design of the tire itself.

These and other results are obtained according to the present invention proposing a tire comprising ribs with a front profile changed in a way that will be explained in the following.

Purpose of the present invention is therefore to provide tires with improved traction capacity that can overcome the limits of the tires according to the known technology and obtain the technical results previously described.

Further object of the invention is that said tires can be manufactured with substantially limited costs, both as regards production costs and as regards management costs.

Another object of the invention is to propose tires that are simple, safe and reliable.

It is therefore a specific object of the present invention to provide a tire comprising a tread provided with a base surface and with a plurality of ribs, each rib being provided with a front wall and a rear wall, wherein on the front wall of the rib, under a top portion of the front wall, a shaped profile is present, with a base in the portion of the tread comprised between the front wall of the rib and the adjacent rib, height equal to a portion of the overall height of the front wall of the rib and a length that extends in the transverse direction with respect to the height of the rib, wherein said shaped profile has a section that defines at least one flat surface of the shaped profile the is parallel, or inclined at an angle $\alpha$ up to 20°, with respect to the surface of the head of the rib, joint to said top portion of the front wall of the rib by means of a connecting surface, at least one sharp corner of the shaped profile, and at least one front wall of the shaped profile, joint to said base surface of the tread by means of a connecting surface.

In particular, according to the present invention, said flat surface of the shaped profile is larger in correspondence of the central portion of the rib.

Preferably, according to the invention, said top portion of the front wall of the rib is inclined at an angle $\beta$ comprised between 10° and 30° with respect to the radial direction.

In particular, according to the invention, said flat surface of said shaped profile is located at a height comprised between 1 mm and 9/10 of the overall height of the rib and preferably is comprised between ¼ and ¾ of the overall height of the rib; while the width of said shaped profile is comprised between 1 mm and 9/10 of the distance between the front wall of the rib and the rear wall of the adjacent rib and preferably between ½ and ⅛ of the width of the head of the rib.

Moreover, according to the present invention, said shaped profile has a section with steps, i.e. defines a plurality of flat surfaces, a corresponding plurality of sharp corners and front walls, and said steps have a height and width equal to or different from each other.

Finally, according to the invention, the surface of said shaped profile can have a different color from the rest of the tire.

It is evident the effectiveness of the tire of the present invention, which allows to make the action of each rib or lug more efficient, loading an area of the front wall of the lug that would otherwise be underutilized and poorly charged. This modification of the design also allows to download the base of the lug itself prolonging the fatigue resistance.

The presence of an added corner on the front of the rib or lug enhances grip, for the exploitation of the principle of concentration of efforts on said corner.

The additional parallel flat surface also ensures a greater buoyancy on soft ground, reducing the compaction of the latter.

The presence of the shaped profile on the front wall of the rib or lug, creating a discontinuity in the front surface of the rib, improves the function of self-cleaning from soil and mud in agricultural tread.

Figure 2:
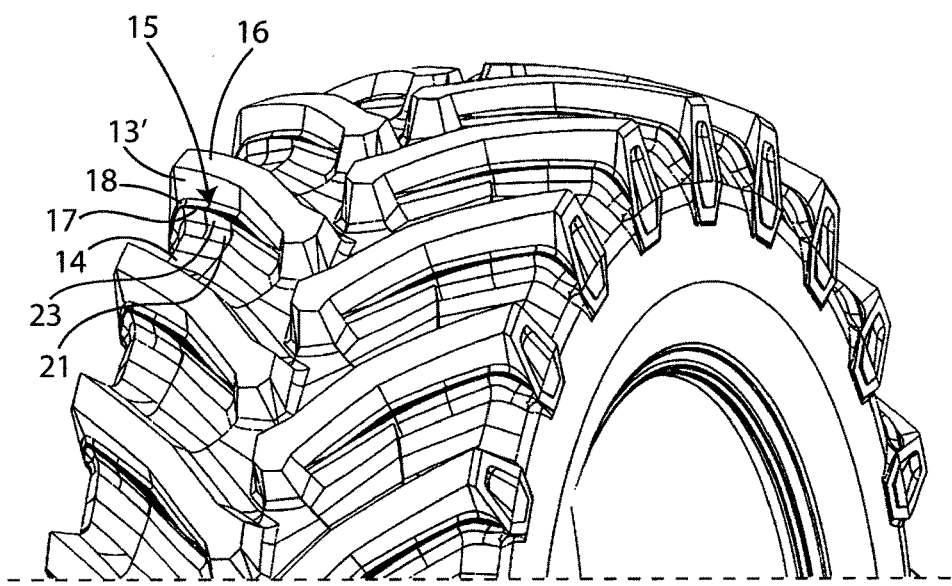
Figure 3:
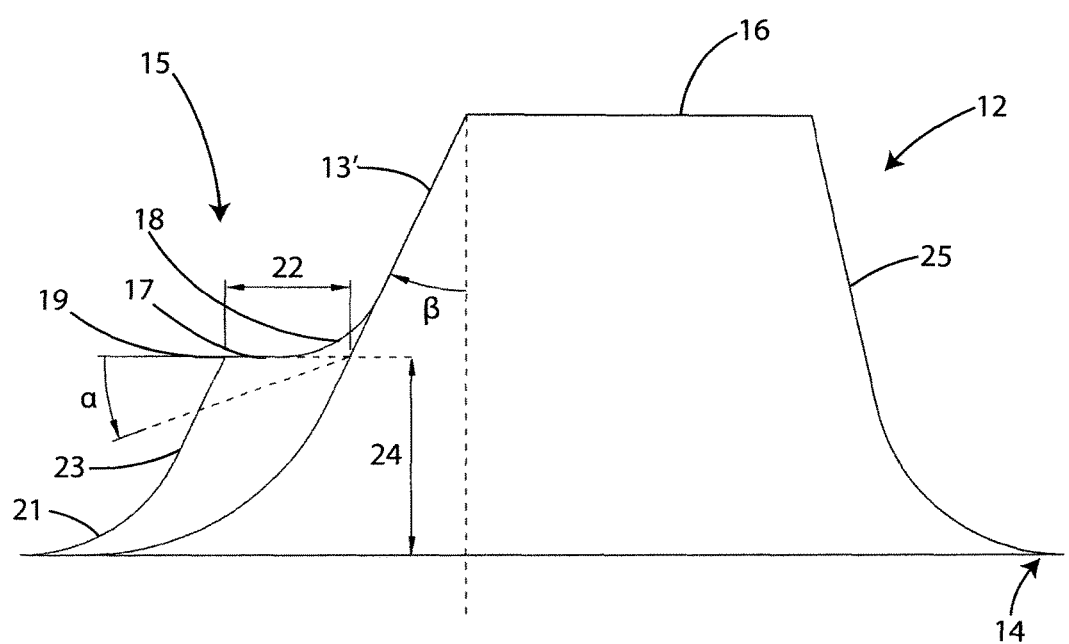
Figure 4:
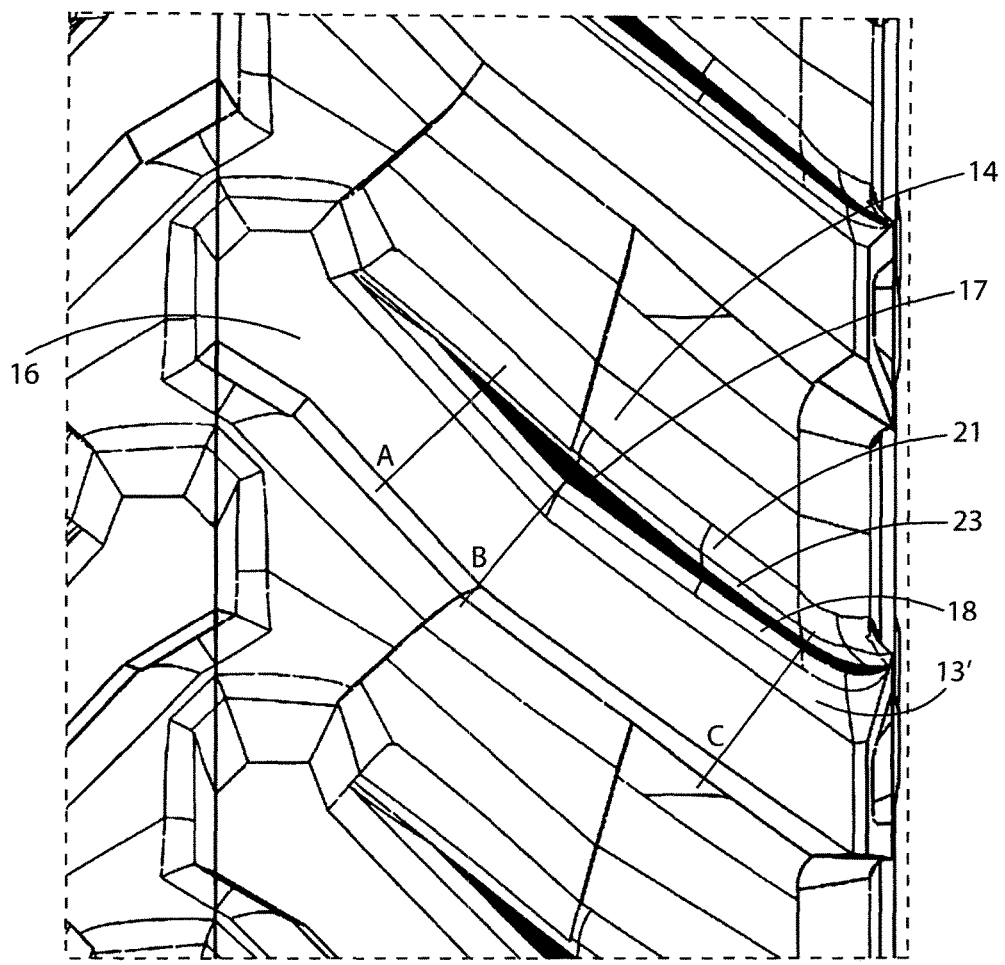
Figure 4A:
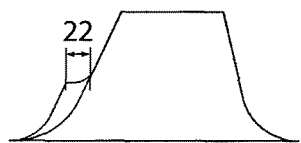
Figure 4B:
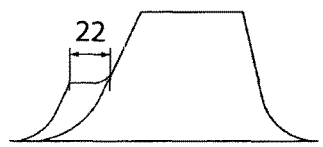
Figure 4C:
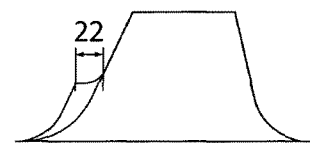

The present invention will now be described, for illustrative but not limitative purposes, according to its preferred embodiment, with particular reference to the figures of the accompanying drawings, wherein:

FIG. 1 shows a perspective view of a portion of a tire according to the prior art, FIG. 2 shows a perspective view of a portion of a tire according to the present invention, FIG. 3 shows a sectional view of a rib of the tire of FIG. 2 superimposed for comparison to a sectional view of a rib of a tire according to the prior art, FIG. 4 shows a plan view of a portion of the tire of FIG. 2, and FIGS. 4A, 4B, 4C each show a section view of a rib of the tire of FIG. 4, respectively in correspondence of the section line A, B and C of FIG. 4.

Referring to the figures, a tire 10 comprises a tread 11 on which a plurality of ribs 12 are made. Each rib 12 is provided with a front wall 13 and a rear wall 25, filleted at the respective ends of the so-called head 16 of the rib, the front wall 13 being the one which, during the rolling of the tire, comes first in contact with the ground.

According to the present invention, the conventional profile of a rib 12 of a tire 10 is modified by adding a shaped profile 15 to the front wall 13 of the rib 12 itself. The section of said shaped profile 15 can be rectangular, trapezoidal, or other shape, with a flat surface 17 substantially parallel, or inclined at an angle a up to 20°, with respect to the surface of the head 16 of the rib 12, joint to a top portion 13' of the front wall of the rib 12 by means of a curve connecting surface 18; a sharp corner 19 of the shaped profile 15, to carve the ground in a more progressive way and a front wall 23 of the shaped profile 15, coupled with the base surface 14 of the tread 11 by means of a curve connecting surface 21.

In many cases, the shaped profile 15, or at least its surface, will be made with a material of different color than the rest of the tire or at least compared to the rest of the rib 12.

The overall height 24 of the shaped profile 15 can be chosen in a range comprised between 1 mm and 9/10 of the height of the rib or lug 12, in consideration of the fact that shaped profiles 15 lower than 1 mm would be irrelevant and that shaped profiles higher than 9/10 of the height of the rib 12 would lead to a simple enlargement of the same. Preferably, in order to obtain better results in terms of traction of the tire, the height of the shaped profile 15 can be chosen between ¼ and ¾ of the overall height of the rib 12.

The width 22 of the shaped profile 15 can vary in a range comprised between 1 mm and 9/10 of the distance between the front wall 13 of the rib 12 and the rear wall 25 of the adjacent rib 12, in view of the fact that the shaped profiles 15 thinner than 1 mm would be irrelevant and that shaped profiles larger than 9/10 of the space between two ribs or lugs would close the space dedicated to the discharge of ground. Preferably, in order to obtain the better results in terms of traction of the tire, the width of the shaped profile 15 can be chosen between ½ and ⅛ of the width of the head 16 of the rib 12.

With reference in particular to FIGS. 4, 4A, 4B, 4C, the width 22 of the shaped profile 15, and more particularly of the flat surface 17 of the shaped profile 15 is greater in correspondence of the central portion of the rib 12.

In the case wherein said shaped profile 15 has a section with steps, said steps can have height and width equal to or different from each other, always within the overall limits previously said.

When the tire is in road configuration, the presence of the shaped profile 15 has the effect of increasing the bending stiffness of the rib 12, reducing the vibration of the rib 12 itself and the effect of brushing on the contact surface, which induces a greater resistance to wear and an increased driving comfort. When the tire occurs to work in field configuration, the pliability of the ground causes the tire to penetrate deep into the soil, allowing the shaped profile 15 of the rib 12 to come in contact with the ground, with the following benefits:

- a significant increase of the flat surface of the rib 12, which allows to increase the surface of contact along the direction of the width of the rib 12 itself, assuring greater buoyancy on soft ground, reducing the compaction of the latter;
- a possible increase of the front surface of the rib 12, which allows to increase the surface of contact along the direction of the depth of the rib 12;
- a significant increase of the edge effect, ie the concentration of efforts on said edge, which on very slippery soils allows the tire 10 better "cling" to the ground, producing benefits from the point of view of tensile strength and limiting slippage. This is particularly beneficial on tuft in terms of dew; and
- a better self-cleaning from soil and mud in the agriculture tread, due to the discontinuity in the front surface of the rib.

The present invention has been described for illustrative but not limitative purposes, according to its preferred embodiment, but it is to be understood that variations and/or modifications can be made by those skilled in the art without departing from the scope of the claims, as defined by the annexed claims.

The invention claimed is:

1. Agricultural or forestry tire (10) comprising a tread (11) provided with a base surface (14) and with a plurality of ribs (12), each rib (12) being provided with a head (16), a front wall (13) and a rear wall (25), wherein, on the front wall (13) of the rib (12), under a top portion (13') of the front wall (13), a shaped profile (15) is present, with a bottom of the shaped profile (15) in the portion of the tread (11) comprised between the front wall (13) of the rib (12) and the adjacent rib, height equal to a portion of the overall height of the front wall (13) of the rib (12) and a length that extends in the transverse direction with respect to the height of the rib (12), and wherein said shaped profile (15) is not present on the rear wall (25) of the rib (12), wherein said shaped profile (15) has a section that defines at least one flat surface (17) of the shaped profile (15), wherein said flat surface is joined to said top portion (13') of the front wall (13) of the rib (12) by means of a connecting surface (18), and wherein the shaped profile (15) comprises at least one sharp corner (19) and a front wall (23) which is joined to said base surface (14) of the tread (11) by means of another connecting surface (21), characterized in that said flat surface is parallel, or inclined at an angle a up to 200, with respect to the surface of the head (16) of the rib (12) and the shaped profile (15) is obtained by addition of material to the front wall (23) of the rib (12), and wherein said flat surface (17) of the shaped profile (15) is larger in correspondence of the middle of the rib (12).

2. The agricultural or forestry tire (10) according to claim 1, characterised in that said top portion (13') of the front wall (13) of the rib (12) is inclined at an angle β comprised between 10° and 30° with respect to the radial direction.

3. The agricultural or forestry tire (10) according to claim 1, characterised in that said flat surface (17) of said shaped profile (15) is located at a height comprised between 1 mm and 9/10 of the overall height of the rib (12).

4. The agricultural or forestry tire (10) according to claim 3, characterised in that said flat surface (17) of said shaped profile (15) is located at a height comprised between ¼ and ¾ of the overall height of the rib (12).

5. The agricultural or forestry tire (10) according to claim 1, characterised in that the width (22) of said shaped profile (15), from the sharp corner (19) to an intersection where the connecting surface and the top portion of the front wall meet, is comprised between 1 mm and 9/10 of the distance between the front wall (13) of the rib (12) and the rear wall (25) of the adjacent rib (12), at the height of said shaped profile (15).

6. The agricultural or forestry tire (10) according to claim 1, characterised in that the width (22) of said shaped profile (15), from the sharp corner (19) to an intersection where the connecting surface and the top portion of the front wall meet, is comprised between ½ and ⅛ of the width of the head (16) of the rib (12).

7. The agricultural or forestry tire (10) according to claim 1, characterised in that said shaped profile (15) has a section with steps, i.e. defines a plurality of flat surfaces of the shaped profile (15), a corresponding plurality of sharp angles and front walls of the shaped profile, wherein said steps have a height and width equal to or different from each other.

8. The agricultural or forestry tire (10) according to claim 1, characterised in that the surface of said shaped profile (15) has a different color from the rest of the tire.

* * * * *